United States Patent
Divisi (10) Patent No.: US 10,539,269 B2
(45) Date of Patent: Jan. 21, 2020

(54) MINIMAL LUBRICATION DEVICE WITH FINE ADJUSTMENT OF THE FLOW OF OIL

(71) Applicant: DROPSA S.p.A., Milan (IT)

(72) Inventor: Walter Divisi, Rue Princesse Caroline (MC)

(73) Assignee: DROPSA S.P.A., Milan (IT)

( * ) Notice: Subject to any disclaimer, the term of this patent is extended or adjusted under 35 U.S.C. 154(b) by 270 days.

(21) Appl. No.: 15/618,618

(22) Filed: Jun. 9, 2017

(65) Prior Publication Data

US 2017/0363252 A1 Dec. 21, 2017

(30) Foreign Application Priority Data

Jun. 15, 2016 (IT) .......................... 102016000061776

(51) Int. Cl.
*F16N 27/00* (2006.01)
*F16K 1/38* (2006.01)
(Continued)

(52) U.S. Cl.
CPC .............. *F16N 27/005* (2013.01); *F16K 1/38* (2013.01); *F16K 1/40* (2013.01); *F16N 7/32* (2013.01);
(Continued)

(58) Field of Classification Search
CPC . F16N 27/005; F16N 7/32; F16N 7/38; F16N 7/385; F16N 13/22; F16N 2200/02; F16K 1/38; F16K 1/40
See application file for complete search history.

(56) References Cited

U.S. PATENT DOCUMENTS 1,625,921 A * 4/1927 Vallier ...................... F16K 1/40
137/505
1,921,761 A * 8/1933 Leins .................... F16K 5/0207
137/613
(Continued)

FOREIGN PATENT DOCUMENTS

DE 529268 C 7/1931
DE 1922631 A1 11/1970
(Continued)

OTHER PUBLICATIONS

Italian Search Report and Written Opinion dated Mar. 10, 2017 for IT UA20164408 to DROPSA S.P.A. filed Jun. 15, 2016.

*Primary Examiner* — Michael A Riegelman
(74) *Attorney, Agent, or Firm* — Vorys, Sater, Seymour and Pease LLP (57) ABSTRACT

A minimal lubrication device including a lubricating fluid storing tank, conduit for supplying the lubricant pressurized to at least one modular element. The at least one modular element including a lubricating fluid conduit intercepted by flow regulator and compressed air conduit, such conduits fluidically connected to air and lubricant mixing element. The flow regulator including a shutter that can be at least partially housed in calibrated hole and movable between upper and lower stroke position ends. The calibrated hole in fluid communication, on one side, with pressurized lubricant delivery and, on the other side, with the mixing element. The shutter having at least one conical profile portion insertable in the calibrated hole. The conical profile portion has a surface groove facing a surface defining the calibrated hole at least when the shutter is in an intermediate position between the lower and upper stroke position ends.

20 Claims, 7 Drawing Sheets

(51) Int. Cl.
*F16K 1/40* (2006.01)
*F16N 7/32* (2006.01)
*F16N 7/38* (2006.01)
*F16N 13/22* (2006.01)

(52) U.S. Cl.
CPC .............. *F16N 7/38* (2013.01); *F16N 7/385* (2013.01); *F16N 13/22* (2013.01); *F16N 2200/02* (2013.01)

(56) References Cited

U.S. PATENT DOCUMENTS

| | | | | |
|---|---|---|---|---|
| 1,982,021 A * | 11/1934 | Renfrew | ............... | F16N 27/005 138/42 |
| 2,830,767 A * | 4/1958 | Herbenar | ............... | F16K 11/056 137/119.01 |
| 3,587,782 A * | 6/1971 | Russell | ............... | F02N 7/08 184/7.4 |
| 3,626,977 A * | 12/1971 | Riley | ............... | F16K 15/028 137/516.25 |
| 3,706,355 A * | 12/1972 | Oglesbee | ............... | F16N 7/32 184/55.1 |
| 3,841,354 A * | 10/1974 | McDonnell | ............... | A61M 5/16881 138/43 |
| 4,088,300 A * | 5/1978 | Suzuki | ............... | F16K 1/32 251/214 |
| 4,176,683 A * | 12/1979 | Leibinsohn | ............... | A61M 5/16881 137/559 |
| 4,177,947 A * | 12/1979 | Menzel | ............... | B05B 1/3026 138/45 |
| 4,245,465 A * | 1/1981 | Milo | ............... | F16N 27/00 184/6.11 |
| 4,542,766 A * | 9/1985 | Gawer | ............... | F04C 29/021 137/550 |
| 4,741,510 A * | 5/1988 | Baumann | ............... | F16K 7/16 251/120 |
| 5,598,974 A * | 2/1997 | Lewis | ............... | B05C 5/0225 137/315.01 |
| 6,065,689 A * | 5/2000 | Kizer | ............... | F16N 7/34 184/55.1 |
| 6,644,620 B2 * | 11/2003 | Johnson | ............... | B67D 3/045 222/504 |
| 2004/0004203 A1 * | 1/2004 | Smith | ............... | F16K 47/06 251/205 |
| 2004/0238772 A1 * | 12/2004 | Bachman | ............... | F02M 61/163 251/126 |
| 2011/0120802 A1 * | 5/2011 | Divisi | ............... | F16N 7/32 184/6.26 |
| 2011/0120803 A1 * | 5/2011 | Divisi | ............... | F16N 7/32 184/26 |
| 2012/0031703 A1 * | 2/2012 | Divisi | ............... | F16K 1/38 184/6 |
| 2012/0031705 A1 * | 2/2012 | Divisi | ............... | F16N 7/32 184/55.1 |
| 2017/0363252 A1 * | 12/2017 | Divisi | ............... | F16N 7/38 |

FOREIGN PATENT DOCUMENTS

EP  1857748 A1  11/2007
EP  2416053 A2  2/2012

* cited by examiner

MINIMAL LUBRICATION DEVICE WITH FINE ADJUSTMENT OF THE FLOW OF OIL

CROSS-REFERENCE TO RELATED APPLICATION

This claims the benefit of Italian patent application no. 102016000061776 filed Jun. 15, 2016, incorporated herein by reference in its entirety.

FIELD OF THE INVENTION

The present finding refers to an air/oil minimal lubrication device.

More specifically, it refers to a modular device.

BACKGROUND OF THE INVENTION

Air/Oil lubrication technology represents a relatively recent reality and is the result of the introduction of advanced industrial technologies that have allowed the application thereof mainly in the field of dry machining. It has also replaced conventional nebulization systems, due to their negative environmental impact.

Basically, lubrication takes place by supplying an air flow that operates continuously, supplying not only a means of transportation for the oil to the lubrication point, but also a means for cooling the members to be lubricated and for the lubrication system.

The oil, injected into the air flow continuously or at regular intervals, covers the surfaces to be lubricated reducing friction and wear.

Given that the amount of lubricant that must be injected in the flow is very low, in known devices there are substantial problems of adjustment of such an amount.

EP2416053-A2, to the same Applicant and that is considered to be incorporated here for reference, describes a module equipped with a shutter with a conical surface. Such a shutter allows a fine adjustment of the flow rate of oil.

However, once a certain flow rate has been adjusted, even though the position of the shutter is kept unchanged, over time, for unknown reasons, there is a decrease in flow rate. This occurs in particular when it is necessary to supply very low flow rates.

SUMMARY OF THE INVENTION

The purpose of the present finding is, therefore, that of making an air/oil lubrication device that is improved with respect to the prior art, being capable of providing the area to be lubricated with a continuous or discontinuous air jet, with an amount of lubricant that remains stable over time, allowing a simple and accurate adjustment of such an amount.

These and other purposes are accomplished by making a device for air/oil lubrication according to the technical teachings of the attached claims.

BRIEF DESCRIPTION OF THE DRAWINGS

Further characteristics and advantages of the finding will become clear from the description of a preferred but not exclusive embodiment of the finding, illustrated as an example and therefore not for limiting purposes in the attached drawings, in which.

DETAILED DESCRIPTION OF THE INVENTION

With reference to the above-mentioned figures, a device for air/oil lubrication is shown, globally indicated with reference numeral 1.

It comprises a tank 2 for storing a lubricating fluid that can be supported by a fixing plate 3 of the device. The tank may include a sensor element (for example a float) of the level of the fluid inside it and a filter 5, associated with an opening 6 for introducing lubricant in the tank. The fixing plate 3 may have a conduit that connects an outlet of the tank with an intake of a pump 6, preferably at high pressure, which can be connected under the plate.

The conduit in particular can supply an intake 7 with the lubricating fluid coming from the tank 2.

The pump 6 may comprise a first oil-hydraulic pumping block 6A through a cylinder 9 of the fluid and a second pneumatic actuation block 6B of the cylinder 9.

The pump advantageously supplies pressurized oil (preferably between 10 and 100 bars) to the delivery 18.

In an alternative embodiment the pump may not be present and the delivery 18 can be supplied directly by an outlet of the tank that contains the lubricant put under pressure by known pneumatic systems. The pressure of the lubricant in such a case is comprised between 3 and 40 bars.

Figure 1:
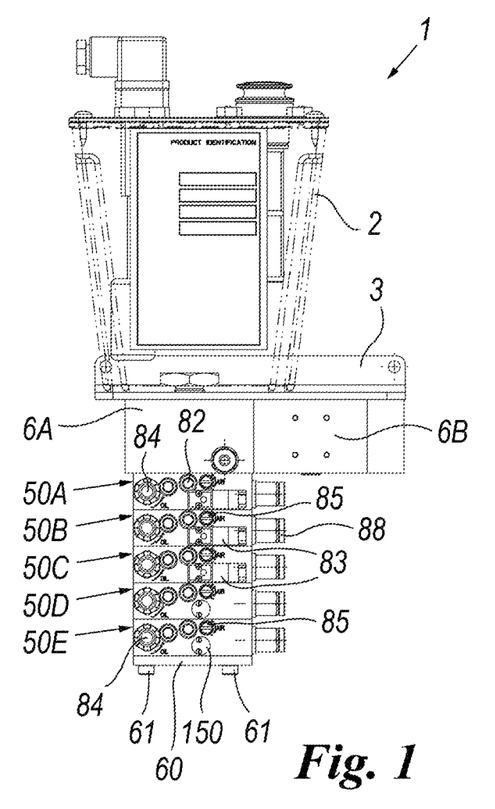
FIGS. 1, 2 and 3 are, respectively, a front, side and rear view of the device of the present invention.

Below the pump it is possible to mount a series of modular elements 50A, B, C, D, E, rested on one another (FIG. 1). They can be fixed to one another and to the pump by means of a pair of through screws 61 housed in fixing holes 8 (or openings) provided in each modular element and at the pump.

In particular, the pump can comprise a surface 70 with a hole 18 in communication with a delivery of the pump and a hole 33 in communication with the supply 31 of compressed air.

Each modular element (FIG. 6) can have a first passage 72 with axis coinciding with the axis of the hole 33 of the pump and a second passage 73 with axis coinciding with the axis of the hole 18 of the pump. The passages 72 and 73 advantageously pass all the way through and engage both of the surfaces 74 and 75 of the modular element.

Figures 2, 3:
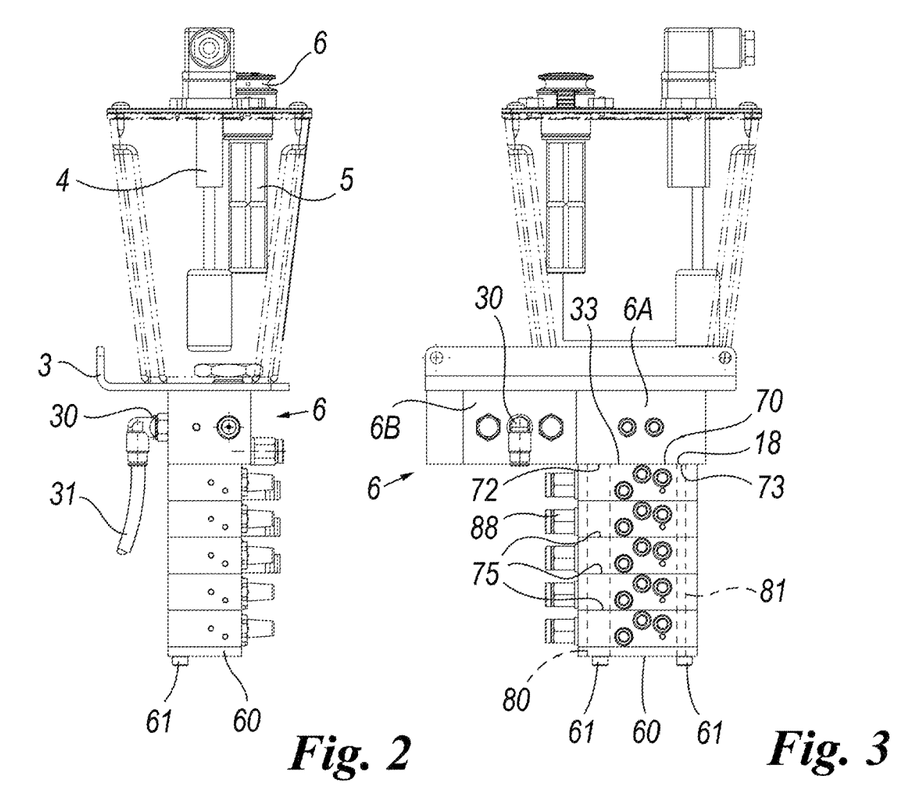

When many modular elements are fixed to the pump like in FIG. 3, the passages 72 and 73 of each modular element define a pressurized oil conduit 81 and a pressurized air conduit 80 respectively connected to the delivery 18 of the pump 6 and to a source or supply 31 of compressed air.

Each modular element 50 draws the compressed air and the pressurized oil needed for its operation from such conduits 80, 81.

Figure 4:
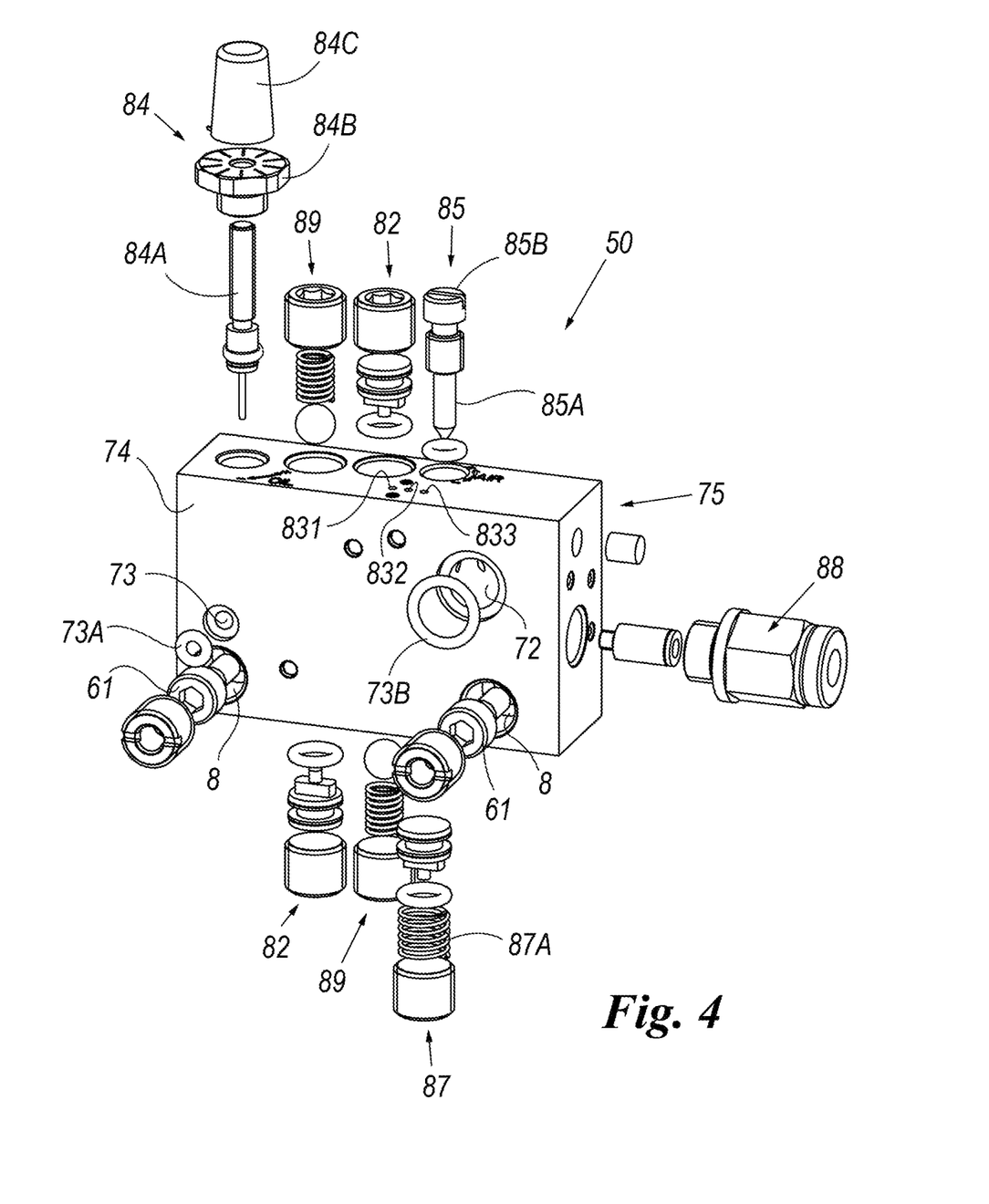
FIG. 4 shows an exploded view of a modular oil/air mixing element of the present invention.

In particular, the scheme with which each modular element 50 can be made is present in FIG. 4. From here it can be understood that the lubricant delivered from the pump 6 can reach, through the conduit 81, the flow regulator 84 that partializes the amount of oil in inlet.

Figure 6:
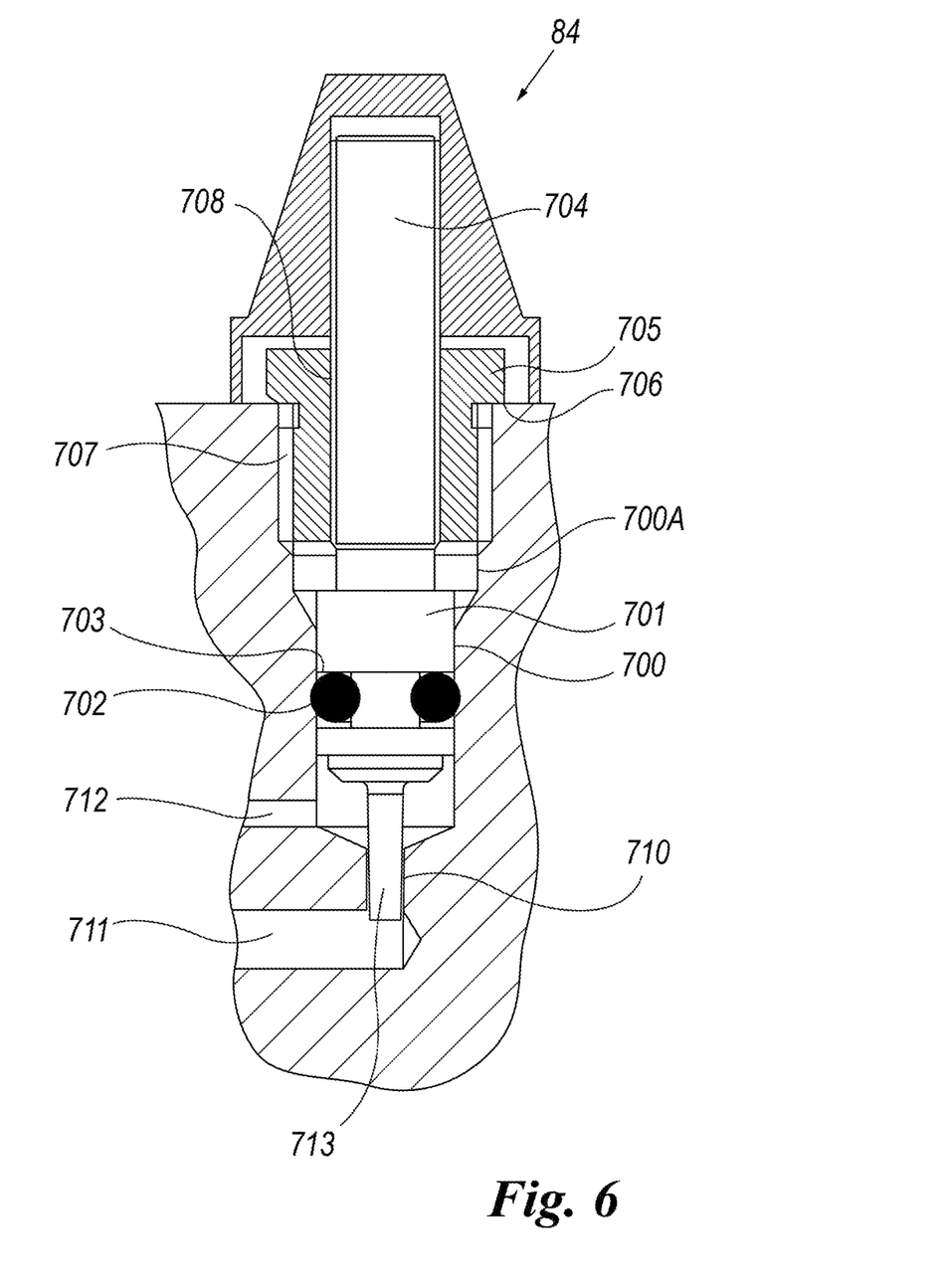
FIG. 6 is an enlarged section view of a flow regulator integrated in the modular element.

The flow regulator can be formed from a cylindrical seat 700 in which a moving body 701 sealably slides. The seal can be made by means of an O-ring 702 housed in an annular seat 703 formed in the moving body. A control rod 704 can project from the moving body, advantageously formed integrally. The control rod 704 can have a length such as to project from the module 50 in each operative position, and also may have a thread that can engage in a bush 705 screwed into a portion 700A having greater radius of the seat 700. The bush goes into abutment through a flange 706 thereof on the modular element 50, and acts as upper end of stroke for the moving body.

The control rod may not be formed integrally with the moving body, but can be coupled with a hinging that allows the rod to rotate idly on the moving body, whilst still remaining axially integral with it.

The pitch of the thread 708 between bush and rod is advantageously 0.35 mm/turn, but it can be comprised between 0.1 and 2.0 mm/turn.

On the bottom of the seat 700 there can be a calibrated hole 710 that is coaxial with respect to the seat 700. The hole may be cylindrical.

The hole 710 opens into a conduit 711 in communication with the delivery of said pressurized lubricant, which can come from the pump. The outlet of the calibrated hole 710 opens into the seat 700 in turn communicating with the outlet conduit 712 of the lubricant with regulated pressure, which can be fluidically connected to the mixing element 88.

A shutter projects from the bottom of the moving body, preferably formed integrally, said shutter being at least partially housed in the calibrated hole when it is in at least one intermediate position between the upper and lower end of stroke.

The shutter 713 can have at least one conical profile portion 713A (see FIGS. 7 and 9) that generates an annular outlet port of the pressurized lubricant with the calibrated hole.

Figure 7:
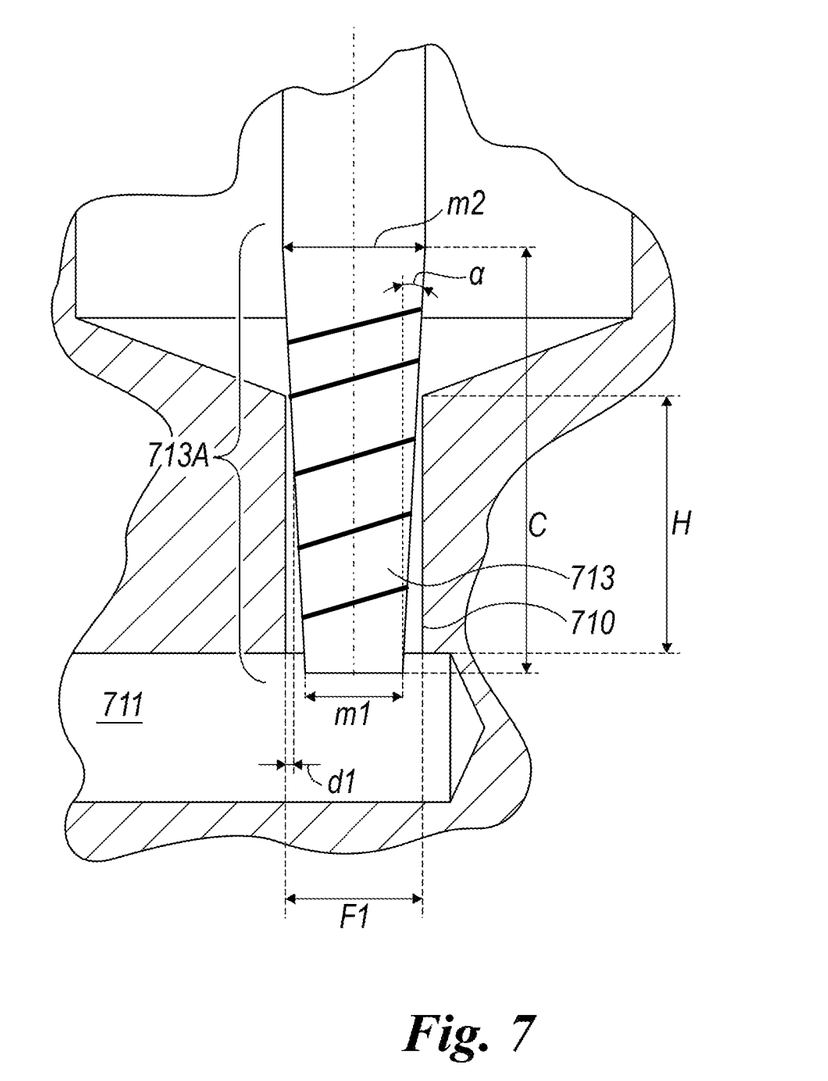
FIGS. 7 and 8 are section views of a shutter of the modular element in two different operative positions.
Figure 9:
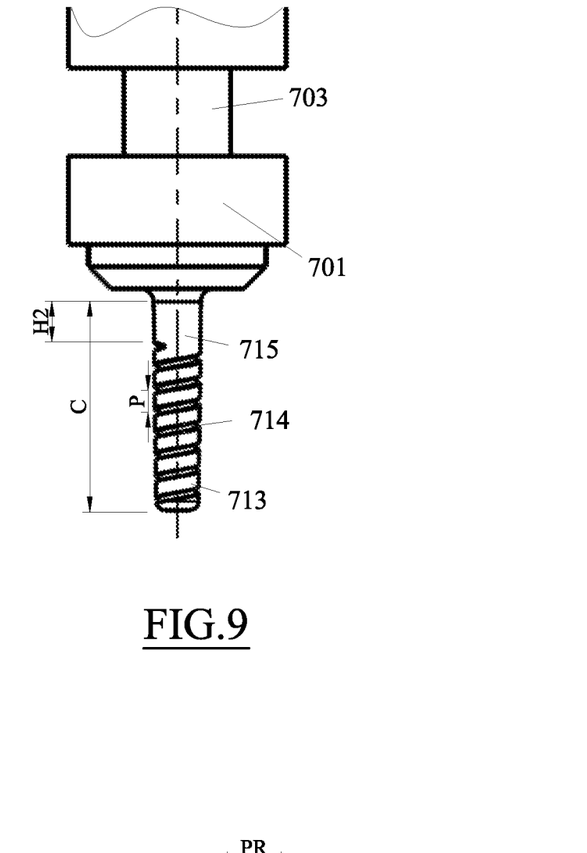
FIGS. 9 and 10 are views of some enlarged and simplified details of parts of the present invention.

Depending on the position of the shutter in the hole, the annular port will have a passage surface for the lubricant that is different, and it is thus possible to obtain a very fine and precise adjustment of the flow rate of lubricant.

Figure 8:
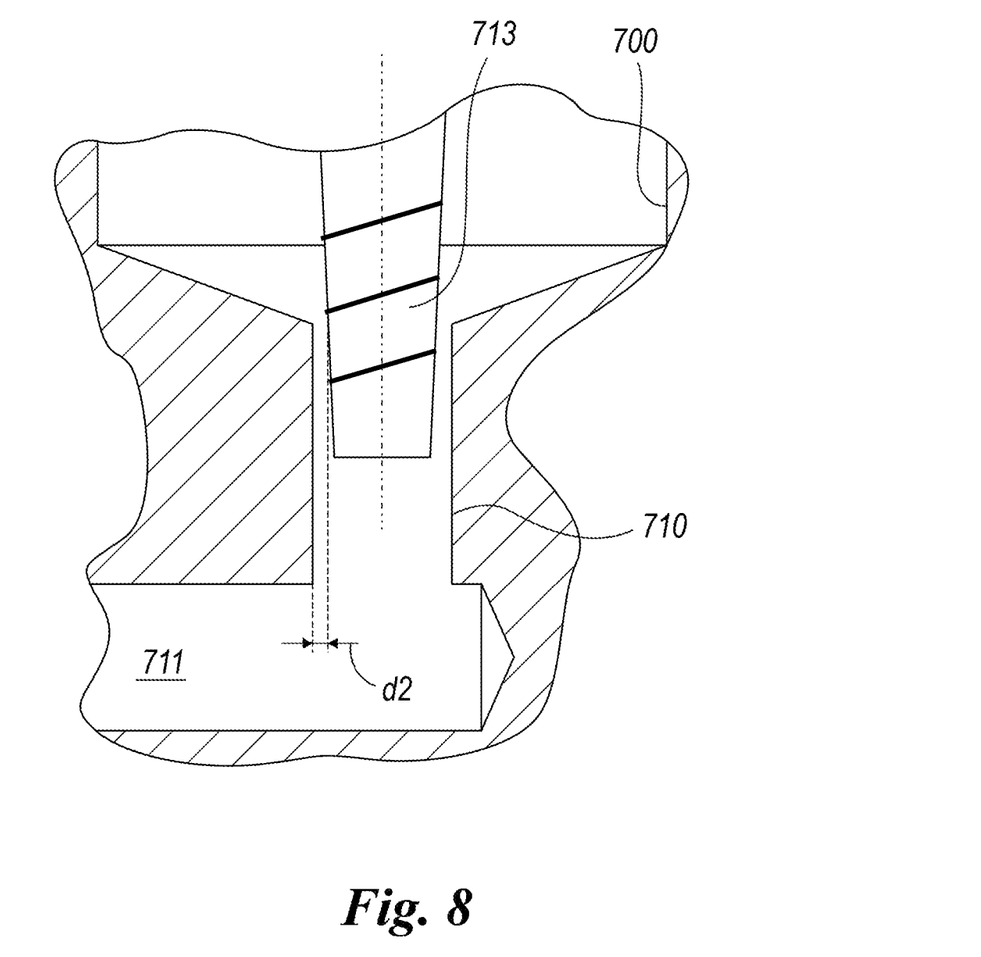

Such a characteristic can be seen from the enlargement of FIGS. 7 and 8. In the case in which the shutter 713 is conical, for a substantial axial movement of the shutter, for example 2 or 3 turns, a minimum increase in space $d1$, $d2$, comprised between the wall of the calibrated hole and the conical surface of the shutter, is obtained.

Advantageously, the shutter will have a stroke that will never allow it to come out from the calibrated hole 710, when in upper end of stroke position. Preferably, also when the shutter is in lower end of stroke position there is never a seal between the shutter and the calibrated hole. Thus, there will always be a leaking of lubricant, although minimal, since the annular port will never be perfectly closed.

The conical profile portion 713A can have a sloped surface with respect to the axis of the shutter with an angle $\alpha$ comprised between 0.1 deg and 2 deg, but preferably 0.57 deg.

The minimum diameter $m1$ of said shutter (which is in its bottom end) in said conical portion can be comprised between 0.5 mm and 5.0 mm preferably 0.95 mm, whereas the maximum diameter $m2$ of said shutter in said conical portion can be comprised between 0.55 mm and 5.1 mm preferably 1.045 mm.

In order to obtain the flow rates required for adjusting the amount of lubricant suitable for minimal lubrication, the diameter $F1$ of the hole is advantageously comprised between 0.5 mm and 5 mm, preferably 1.0 mm.

The hole can have a height H comprised between 2 mm and 10 mm, preferably 3 mm, whereas the conical portion 710A of the shutter has a height C comprised between 3 mm and 15 mm, preferably 4 mm.

Advantageously, the height C of the conical profile portion has a length comprised between 2 and 6 times the diameter of said calibrated hole, preferably 4 times. The surface of the conical profile 713A can be rectified advantageously with a surface roughness of 0.8 μm.

The seat 700 and the calibrated hole 710, in the embodiment described, are formed directly in the module, but they can also be part of an insert that is inserted in it.

According to an aspect of the finding, the conical profile portion 713A has a surface groove 714 facing a surface defining said calibrated hole 710 at least when the shutter is in an intermediate position between the lower end of stroke position and the upper end of stroke position.

It has been surprisingly discovered that the surface groove 714 made on the shutter prevents a phenomenon of decreasing of the adjusted flow rate, which occurs over time even when the shutter is positioned in the same manner with respect to the hole 710.

Therefore, the presence of the groove on the conical portion 713A of the shutter, regularizes and makes constant over time the optimized flow rate by means of the positioning of the shutter with respect to the hole.

The regularization of the flow rate is particularly effective for very low flow rates, of the order of 60 Ml/h (1 Ml/min).

Advantageously, as shown in FIG. 9, the surface groove is of the screw type, and its pitch can be constant. It has been found that a pitch comprised between 0.3 mm/turn and 1 mm/turn provides excellent results.

It should be noted that in FIG. 9, the profile of the shutter is conical, as described above. In this scale, however, the conicity of the profile cannot be appreciated.

As can be seen from FIG. 9, the conical profile 713A comprises at least one initial part 715, of height H2 comprised between 1 and 3 mm, which can be free from said groove 714.

Such an initial part has the function of allowing a total closure of the passage in the case of exclusion of the module.

It has been found by experimental tests that the depth PR (FIG. 10) of said optimal groove can be comprised between 0.1 and 0.5 mm, advantageously 0.4 mm.

Figure 10:
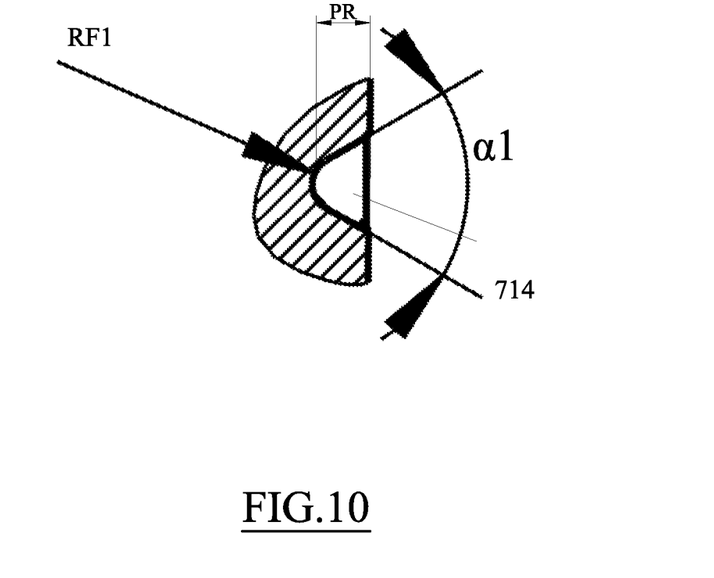

The groove can have an inner radius RF1 comprised between 0.05 and 0.1 mm. Moreover, the opening angle $\alpha 1$ of the screw (or thread) can be comprised between 40° and 80°, preferably 60°.

Figure 5:
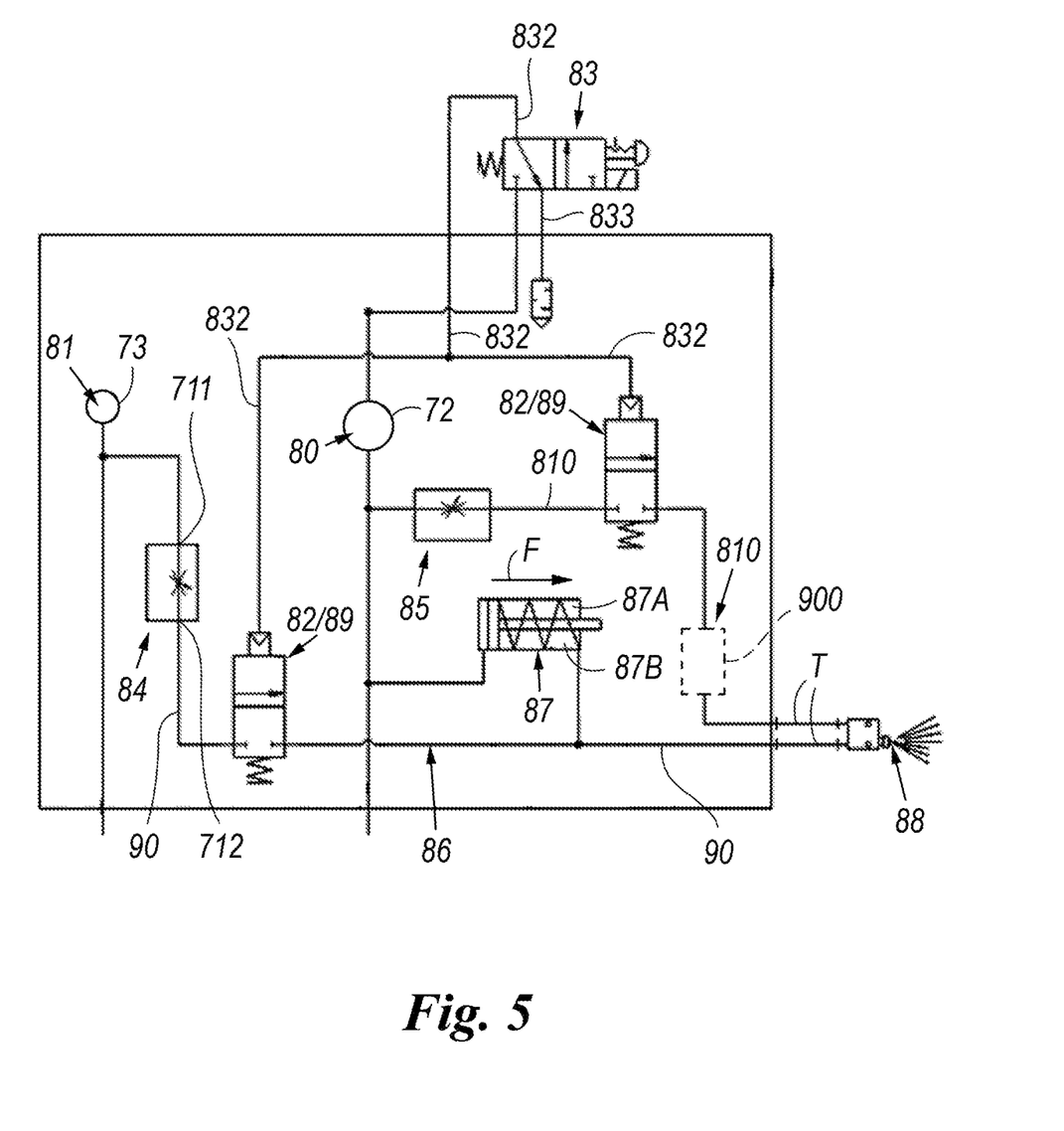
FIG. 5 shows a diagram of the modular mixing element.

Going back to the description of FIG. 5, it should be noted that the line 90 of lubricant can be intercepted by an intercepting element that in the example is a pilot piston 82 coupled with a spring valve 89 controlled by a solenoid valve 83. The conduit 90 can also have a branch that connects it to an anti-drip piston 87 further connected to the supply of pressurized air.

In the presence of air in the conduit 80 it is in the position illustrated by the arrow F (opposite to the one illustrated, with the spring 87A compressed). When the conduit 80 is without pressure, the spring 87A elongates and the piston goes into the position illustrated sucking the lubricant present in the conduit 90 inside a chamber 87B.

The conduit 80, through the passage 72, is in communication with a tap 85 for adjusting the air flow the outlet of which opens through a conduit 810 in the mixing element 88. The tap 85 also has a tapered shutter 85A this time of the conventional type that has a head 85B that allows the control thereof.

Like in the previous case, the conduit 810 is intercepted by a further pilot piston 82 with a spring valve 89, also controlled by the solenoid valve 83.

The solenoid valve 83 (optional, and which is not present for example in the elements 50D-50E), has an inlet conduit 831 in communication with the compressed air conduit 80. It can connect a control conduit 832 of the pilot pistons 82 to a discharge 833 (pistons 2 open and lines 86 and 810 operative), or to the inlet 831 (pistons 2 closed and lines 86 and 810 not operative).

The mixing element 88 is substantially a nozzle that can be provided directly on each module 50 (FIG. 4) or integrated in it, or that can be connected to the respective module through suitable separate air and lubricant pipes T that take it directly close to the point where the lubrication is required. In the first case a single air/oil pipe will be sufficient, which directly reaches the use position from the module.

To conclude the description of the device, it should be emphasized that, in the case of absence of the solenoid valve 83, the holes made on each modular element 50 deriving from the conduits 831, 832 and 833 are closed by a plate 150. In such a case the pilot pistons 82 are always in a position such as to allow the passage of fluids inside the conduits 90 and 810.

Moreover, the air tap 85 may also not be provided. Each module can also be supplied by a different air source, the conduit 80 thus being absent.

The operation of the finding is clear to those skilled in the art from what has been described and in particular it is as follows.

The pump 6 places the lubricating fluid (for example oil) taken from the tank 2 under pressure. The pump is actuated by compressed air that is supplied thereto by the compressed air source 31.

It supplies the modules 50 connected to it both with air and oil through the conduits 80 and 81 formed by passages directly obtained in each of the modules and coupled through possible gaskets 73A, 73B. The various modules can be fixed to one another, and possibly to the pump, through screws 61 passing in suitable holes 8 made in each module.

Alternatively, the modules can be supplied directly by the tank suitably placed under pressure, for example pneumatically, and by a suitable compressed air source. In this case the pump could be absent, and the modules fixed simply to one another at a plate, which can possibly also be connected to the tank.

Each module provides for mixing an amount of fluid able to be adjusted through the flow regulator 84. It is also possible to adjust the amount of air that is dispensed by each module through the tap 85. The adjustment of the lubricant is very fine since the pitch of the screw that controls the shutter allows a perfect adjustment of the annular passage port of the lubricant that is created between the shutter and the calibrated hole. The flow rate is stable over time. As an example, at a pressure of 1.5 bar the passage port goes from a minimum of 0 mm$^2$ to a maximum of 0.064 mm$^2$ that corresponds to an amount of oil that goes from 0 Ml/min to 6 Ml/min.

Indeed, in a preliminary step to the use of the device it is possible to activate only one modular element 50 at a time and adjust the amount of oil emitted. In this way, it is possible to obtain a precise adjustment of the amount of oil emitted by each element.

Advantageously, on the pressurized air conduit 810 of each module there is a conventional vortex tube 900 (FIG. 5) that adjusts the temperature of the air supplied to the nozzle 88. The vortex tube is housed in the module or directly obtained in it. In this way, through a suitable adjustment screw, it is possible to adjust the temperature of the air supplied to the nozzle 88. This allows, as well as the lubrication, a valid cooling effect to be obtained.

The invention claimed is:

1. Minimal lubrication device comprising
a tank of a lubricating fluid,
means for raising the pressure of said lubricant and
means for supplying the pressurized lubricant to at least one modular element,
the at least one modular element comprising a lubricating fluid conduit intercepted by a flow regulator and a compressed air conduit, such conduits being fluidically connected to an air and lubricant mixing element,
the flow regulator comprising a shutter that can be at least partially housed in a calibrated hole and movable between an upper end of stroke position and a lower end of stroke position,
the calibrated hole being in fluid communication with a delivery of said means for raising the lubricant pressure, on one side, and with said mixing element on the other side,
the shutter having at least one conical profile portion insertable in said calibrated hole,
wherein the conical profile portion has a surface groove facing a surface which defines said calibrated hole at least when the shutter is in an intermediate position between said lower end of stroke position and said upper end of stroke position, wherein the surface groove on the conical portion is configured as a screw and/or constant pitch screw for stabilizing flow rate of said lubricant, that in the absence of said surface groove, will decrease over time, and wherein a constant depth of the surface groove and relative position between the surface groove and the calibrated hole prevent decreasing flow rate of said lubricant.

2. The device according to claim 1, wherein the screw and/or constant pitch screw of the surface groove includes a screw pitch comprised between 0.3 and 1 mm/turn.

3. The device according to claim 1, wherein the conical profile portion comprises at least one initial part free from said groove.

4. The device according to claim 1, wherein the depth of said groove is comprised between 0.1 and 0.5 mm.

5. The device according to claim 1, wherein the conical profile portion has a length between 2 and 4 times the diameter of the calibrated hole.

6. The device according to claim 1, wherein the flow regulator comprises a cylindrical seat in which a moving body is sealingly sliding, from which moving body the shutter projects, the moving body being associated with a control rod to adjust, by a thread, the position of the moving body with respect to the seat, the calibrated hole being coaxial with respect to the seat and being obtained on the bottom thereof.

7. The device according to claim 6, wherein the rod has a thread engaged with a bush screwed into said module.

8. The device according to claim 6, wherein the rod is obtained integrally with the moving body and the shutter.

9. The device according to claim 6, wherein the moving body has a housing groove for an O-Ring, and/or wherein the seat and said calibrated hole are obtained directly inside the module.

10. The device according to claim 1, wherein the conical profile portion has a sloping surface with respect to the axis of the shutter with an angle comprised between 0.1° and 2°, and/or wherein the minimum diameter of said shutter in said conical portion is comprised between 0.5 mm and 5.0 mm, while the maximum diameter of said shutter in said conical portion is comprised between 0.55 mm and 5.1 mm, and/or wherein the diameter of said hole is comprised between 0.5 mm and 5 mm, and/or wherein the pitch of said thread is comprised between 0.1 mm/turn and 2 mm/turn.

11. The device according to claim 1, wherein the conical profile portion has a length comprised 4 times the diameter of the calibrated hole.

12. The device according to claim 1, wherein the conical profile portion has a sloping surface with respect to the axis of the shutter with an angle between 0.1° and 2°.

13. The device according to claim 1, wherein the minimum diameter of said shutter in said conical portion is between 0.5 mm and 5.0 mm, while the maximum diameter of said shutter in said conical portion is between 0.55 mm and 5.1 mm.

14. The device according to claim 1, wherein the diameter of said hole is between 0.5 mm and 5 mm.

15. The device according to claim 1, wherein the pitch of said thread is between 0.1 mm/turn and 2 mm/turn.

16. The device according to claim 1, wherein the conical profile portion has a sloping surface with respect to the axis of the shutter with an angle between 0.57° and 2°.

17. The device according to claim 1, wherein the conical profile portion has a sloping surface with respect to the axis of the shutter with an angle comprised between 0.1° and 2°, and wherein the minimum diameter of said shutter in said conical portion is comprised between 0.5 mm and 5.0 mm, while the maximum diameter of said shutter in said conical portion is comprised between 0.55 mm and 5.1 mm, and wherein the diameter of said hole is comprised between 0.5 mm and 5 mm, and wherein the pitch of said thread is comprised between 0.1 mm/turn and 2 mm/turn.

18. The device according to claim 17, wherein the conical profile portion has the sloping surface with respect to the axis of the shutter with an angle between 0.57° and 2°.

19. The device according to claim 18, wherein the depth of the groove is in a range between 0.1 and 0.5 mm.

20. The device according to claim 1, wherein the depth of the groove is in a range from 0.4 to less than 0.5 mm.

* * * * *